Jan. 9, 1945. L. S. WILLIAMS 2,366,947
WEIGHING SCALE
Filed Oct. 29, 1942 4 Sheets-Sheet 1
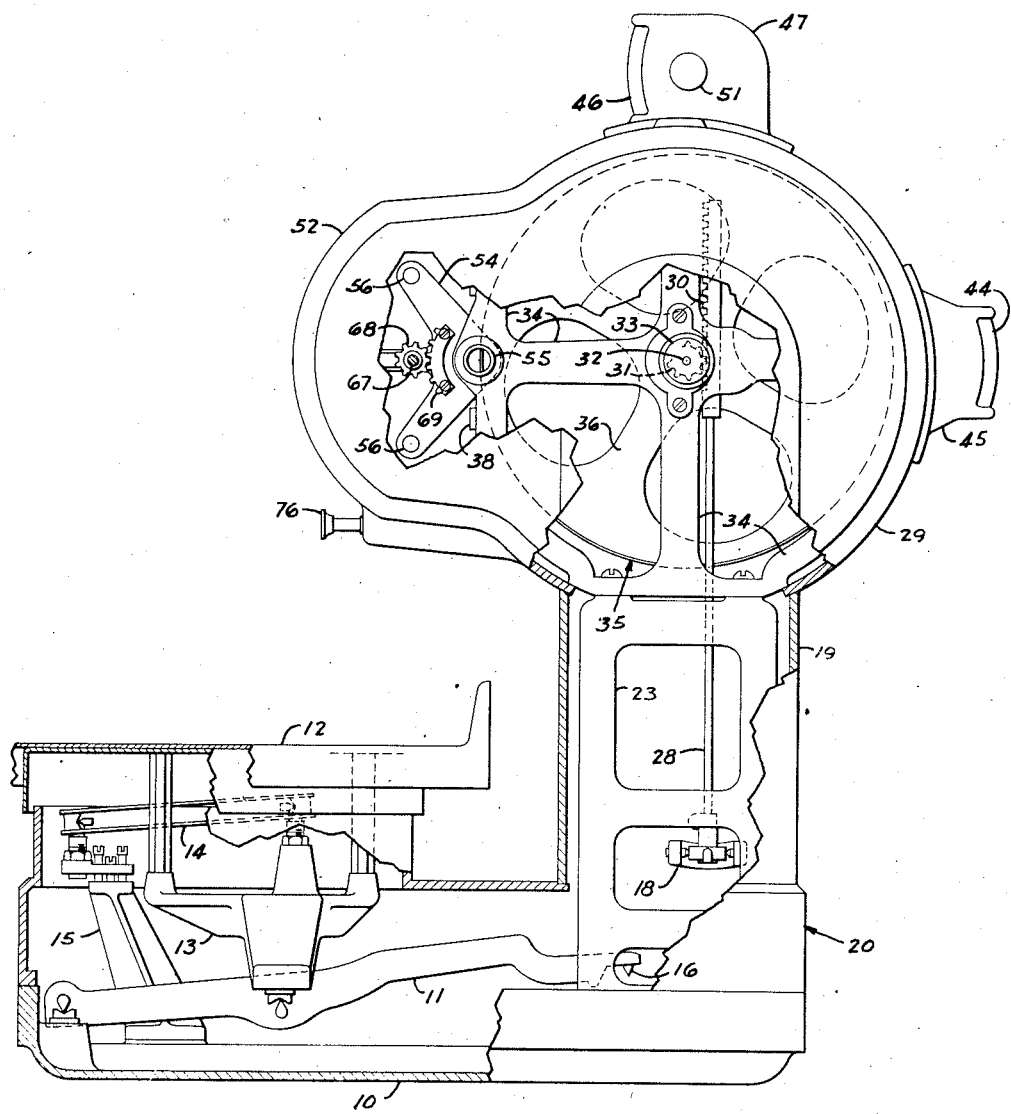
Fig. I
Lawrence S. Williams
INVENTOR
BY Marshall & Marshall
ATTORNEYS Jan. 9, 1945.   L. S. WILLIAMS   2,366,947
WEIGHING SCALE
Filed Oct. 29, 1942   4 Sheets-Sheet 2
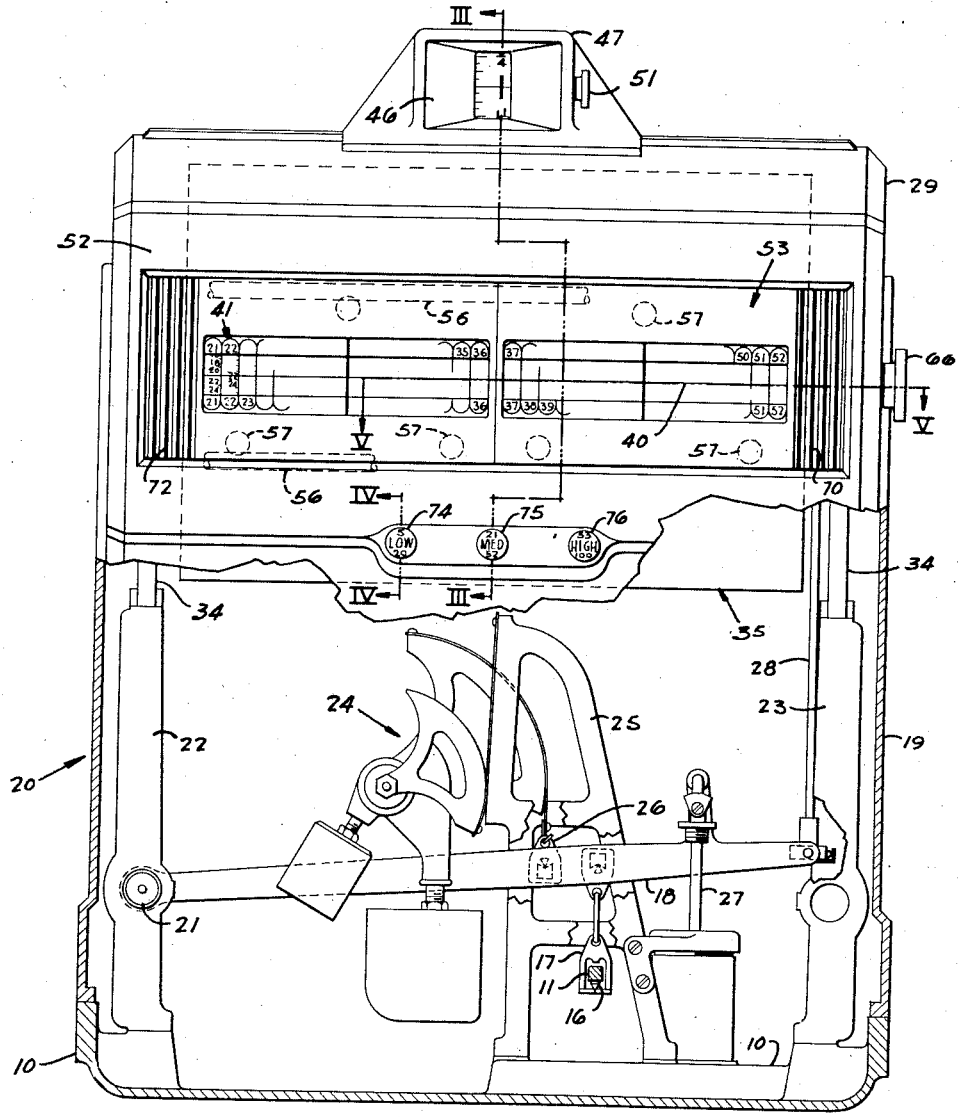
Fig. II
Lawrence S. Williams
INVENTOR
BY Marshall & Marshall
ATTORNEYS

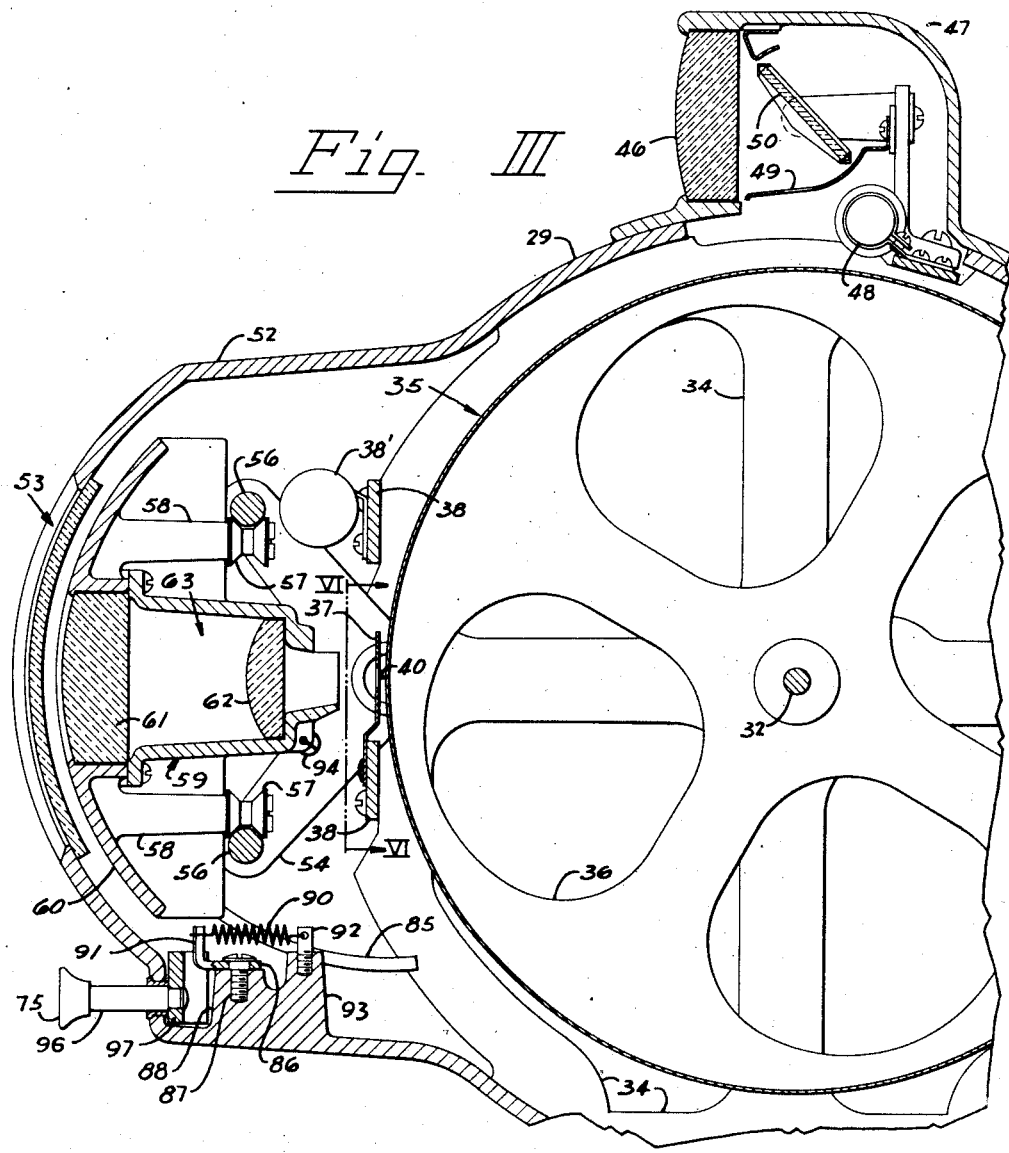
Fig. III
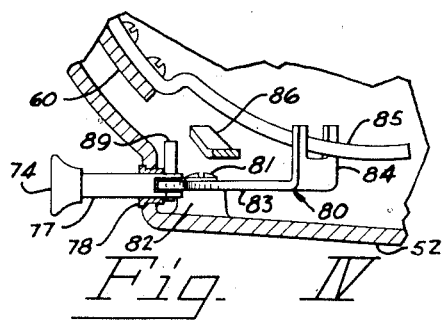
Fig. IV
Lawrence S. Williams
INVENTOR
BY Marshall and Marshall
ATTORNEYS

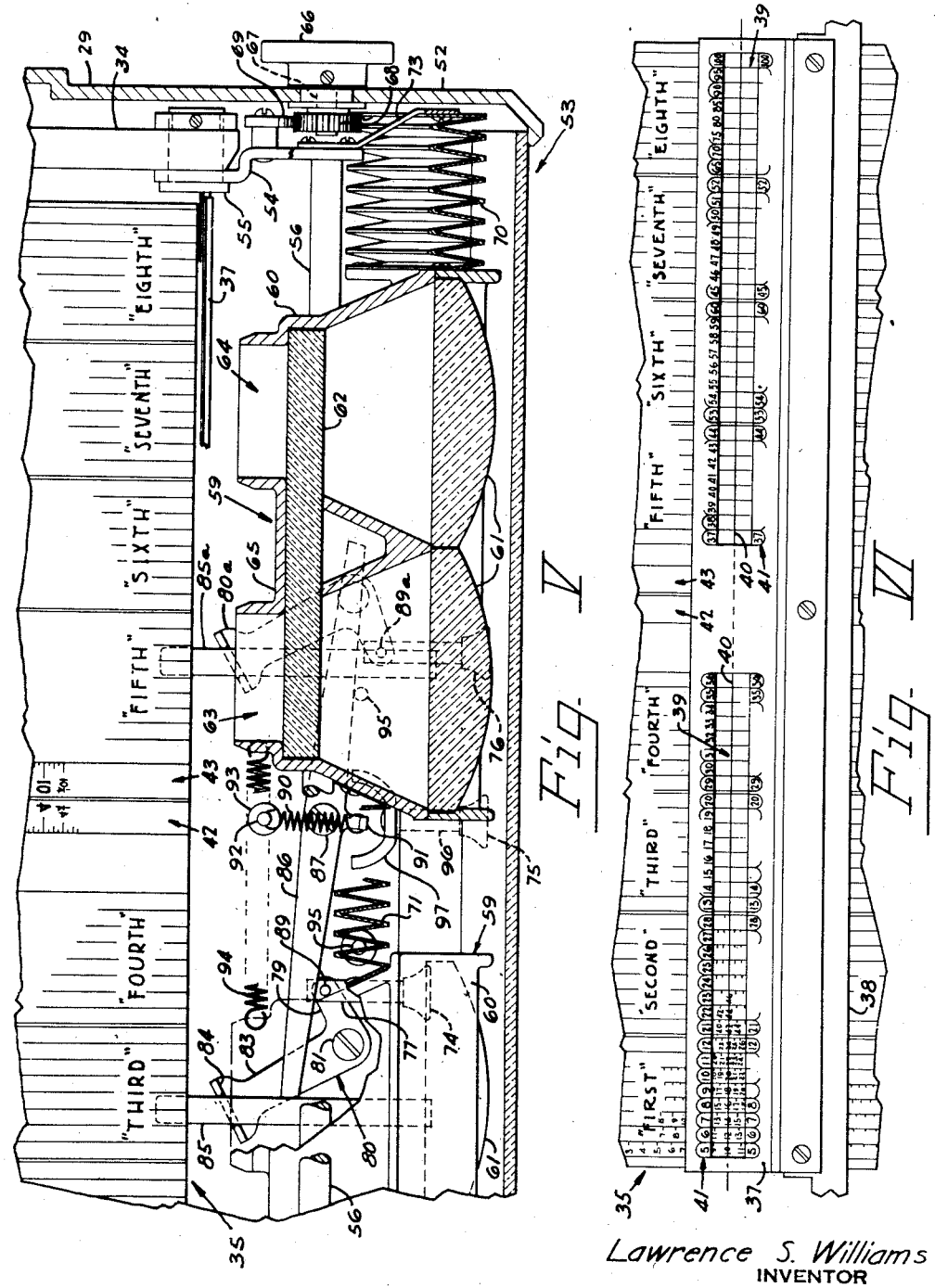

Patented Jan. 9, 1945

2,366,947

UNITED STATES PATENT OFFICE 2,366,947

WEIGHING SCALE

Lawrence S. Williams, Toledo, Ohio, assignor to Toledo Scale Company, Toledo, Ohio, a corporation of New Jersey Application October 29, 1942, Serial No. 463,740

3 Claims. (Cl. 88—1)

This invention relates to weighing scales of the type having a cylindrical chart which is moved with relation to a fixed index in response to loads weighed on the scale and which bears groups of peripheral rows of amount indicia for indicating the value of loads weighed on the scale when computed at various prices per pound, and more particularly to means for shifting viewing apparatus to exhibit only selected groups of prices per pound and groups of associated amount indicia.

Mechanism for providing a cylinder scale with an extremely high number of groups of price and amount indicia which are alternately exhibitable is disclosed in United States Patent No. 1,973,685 to Marshall.

It is an object of this invention to provide novel means for shifting mechanism employed to alternately exhibit such price and amount indicia.

It is another object of this invention to provide means normally to exhibit certain of the price and amount indicia which are most often used, and yet for permitting less frequently used price and amount to be exhibited at will.

It is a further object of this invention to provide key operated means for selecting certain indicia to be used from a large number of indicia, all of which are not visible simultaneously.

More specific objects and advantages are apparent from the description, in which reference is had to the accompanying drawings illustrating a preferred form of scale embodying the invention.

In the drawings:

Fig. I is a fragmentary end view of a weighing scale incorporating mechanism embodying the invention.

Fig. II is a front view of the weighing scale illustrated in Fig. I, certain parts being broken away to more clearly show details of the mechanism.

Fig. III is a fragmentary vertical sectional view, taken substantially on the line III—III of Fig. II.

Fig. IV is a fragmentary detailed view in section, taken substantially on the line IV—IV of Fig. II.

Fig. V is a fragmentary sectional view, taken substantially on the line V—V of Fig. II.

Fig. VI is a fragmentary view, in elevation, taken from the position indicated by the line VI—VI of Fig. III.

These specific drawings and the specific description that follows merely disclose and illustrate the invention and are not intended to impose limitations upon the claims.

A weighing scale adapted to be employed with mechanism incorporating the invention comprises a base 10 on which is pivotally mounted a main lever 11, in turn supporting a load receiver 12 and load-receiver spider 13. A check link 14 is connected between the spider 13 and a post 15 erected on the base 10. A cone pivot 16, which is mounted in the nose end of the main lever 11, is engaged in a stirrup 17 (Fig. II) which is pivotally connected to the load pivot of a pendulum lever 18 extending transversely across the scale inside of an upright portion 19 of a housing 20. The pendulum lever 18 is rockingly mounted in bearings 21 which are supported in one of a pair of upright frame members 22 and 23 which are erected above the base 10, one at each side of the scale.

A ribbon supported load counterbalancing pendulum 24 is mounted on a sector guide 25 and pivotally connected, by means of a stirrup 26, to the pendulum lever 18. A dashpot plunger 27 is also connected to the lever 18 to damp its oscillations. The nose end of the lever 18 is pivotally connected to the lower end of a rack rod 28 extending upwardly into the interior of a dial housing 29 which is mounted atop the upright portion 19 of the housing 20. A rack 30, which is secured on the upper end of the rack rod 28, is in mesh with a pinion 31 secured on a chart shaft 32 journaled in a pair of bearings 33 which are located at the centers of a pair of end frames 34 mounted atop the upright frame members 22 and 23. A cylindrical chart 35 is mounted on the shaft 31 by means of a plurality of spiders 36 (Fig. III).

The chart 35 bears on its surface a plurality of peripheral rows of amount indicia (as can be seen in Fig. VI) which are arranged to cooperate with price indicia carried by a price-indicia member 37 which is mounted on the lower of a pair of bars 38 extending transversely and parallelly across in front of the chart 35 and connecting the two end frames 34. Lamps 38', for illuminating the visible surface of the chart and price-indicia-bearing member, are mounted on the upper one of the bars 38. The price-indicia member 37 has a pair of horizontally extending apertures 39 through which the surface of the chart 35 is visible. The amount indicia inscribed on the surface of the chart 35 are arranged so as to present an indicium, in each of the peripheral rows of indicia, in line with a reading line 40, which indicium corresponds to the value of the particular load on the scale at that price per pound indicated by that one of price indicia 41 carried by the price-indicia-bearing member 37 which is in front of, and associated with, the particular row of amount indicia. As can be seen in Fig. VI, the rows of amount indicia are arranged in groups (which have been designated "First" through "Eighth"), those amount indicia for the prices of 5¢ to 12¢ inclusive (for example) being in one group, those of 13¢ to 20¢ inclusive being in another group, etc. These groups are arranged alternately, i. e., reading from left to right across the price-indicia member 37 or the chart 35 consecutive prices occur in the "First" and "Third" groups forming a "Low" range of prices; in the "Second," "Fourth," "Fifth" and "Seventh" groups, forming a "Medium" range of prices; and in the "Sixth" and "Eighth" groups forming a "High" range of prices.

Also inscribed on the surface of the chart 35 are two peripheral rows of weight indicia 42 and 43, one of which serves as the merchant's weight indicia and the other of which indicates the weight to the customer. The customer's weight indicia is visible through a lens 44 (Fig. I) located in the foremost end of a bezel 45 mounted on the customer's side of the chart housing 29 in line with the row of weight indicia 43. The merchant's weight indicia are visible through a magnifying lens 46 which is mounted in a weight-indicia periscope 47 located on top of the chart housing 29 and containing an illuminating lamp 48, screen 49 and mirror 50 which can be tilted, by means of a knob 51, to reflect the weight indicia 42 at varying angles in accordance with the height of the operator. The screen 49 delineates the area on the chart 35 which is visible through the lens 46.

A shifting mechanism housing 52, formed integrally with the forward part of the dial housing 29, has a windowed aperture 53 which extends horizontally across its forward end. Located inside of the shifting mechanism housing 52 are a pair of angular brackets 54 (Figs. I and III), one of which is hinged at its apex in each of the end frames 34 by means of a hollow bushing 55. The two brackets 54 are connected by two rods 56, one of which extends between the ends of the upper arms of the brackets 54 and the other of which extends between their lower ends. The rods 56 rigidly connect the two brackets 54, and also serve as rails on which there run a plurality of rollers 57 journaled on arms 58 of two lens cell carriages 59 (Figs. II, III and V). Each of the lens cell carriages 59 (Figs. III and V) comprises a frame 60 which mounts a pair of adjacent lenses 61 at its forward end and a cylindrical lens 62 near its rearmost end. Two four-sided frusto-pyramidal lens cells 63 and 64 are formed, one in back of each of the lenses 61, each cell being open both front and rear. The openings at the rear of the lens cells are each equal in width to one of the groups of amount indicia and are separated by a mask 65 which covers that one of the groups of amount indicia located between the two groups of amount indicia visible through the lens cells 63 and 64. The lenses 62 and 61 are of such construction and power that the visible area delineated by the rear openings of the lens cells including the small price and amount indicia borne by the chart 35 and indicia-bearing member 37, which areas are, in reality, half the size of the front of the lenses 61, are magnified to twice their actual size and thus appear completely to fill the area of the lenses 61 (as can be seen in Fig. II).

Each of the lens cell carriages 59 comprises two lens cells and thus there is always visible through the windowed aperture 53 four groups of rows of amount indicia which apparently fill the entire width of the lenses 61. Each of the lens cell carriages has two alternate positions, for instance, the position shown in Fig. V with the lens cells over the "Fifth" and "Seventh" groups of amount indicia and the position to the right of the illustrated position in which the lens cells 63 and 64 would be over the "Sixth" and "Eighth" groups of indicia.

The brackets 54, and thus the rods 56 and the lens cell carriages 59 carried thereby, can be tilted to accommodate clerks of different heights by means of a knob 66 located at the right end of the housing 52 and secured to a short pinion shaft 67 on the innermost end of which is mounted a pinion 68 in mesh with a short arcuate rack 69 secured to one of the brackets 54. Rotation of the knob 66 swings the brackets 54 on their hollow bushings 55 and tilts the lens cells 59.

Because the lens cell carriages 59 are horizontally shiftable, and thus do not completely fill the area of the windowed aperture 53 at all times, three masking bellows 70, 71 and 72 are connected between the outer ends of the lens cells 59 and clips 73 secured to the brackets 54 and between the innermost ends of the lens cell frames 59 themselves.

As can be seen from Fig. VI, the range of prices per pound for which amount indicia are afforded is from 5¢ to $1.00, and these prices can be exhibited by means of the lens cells on their shiftable carriages 59 in any one of the following arrangements: In the left-hand lens cell carriage consecutive prices from 5¢ to 20¢ inclusive or from 21¢ to 36¢ inclusive, and in the right-hand lens cell carriage prices from 37¢ to 52¢ inclusive or from 53¢ to $1.00 inclusive. It has been found that the most frequently used prices are those lying in the range between 21¢ and 52¢, and, therefore, it is desirable that these prices be so located and the mechanism for shifting the lens cell carriages be so arranged that this range of prices normally is exhibited. This range of prices from 21¢ to 52¢ inclusive has been designated "Medium," the range of prices from 5¢ to 20¢ inclusive designated "Low" and the range of prices from 53¢ to $1.00 designated "High."

To shift the lens cell frames into the proper positions for exhibiting these three ranges of prices, there are provided three push buttons 74, 75 and 76 which extend from the lower front portion of the housing 52 below the windowed aperture 53 therein. The push button 74 (Figs. IV and V) is mounted on a stem 77 which is horizontally slidable in a bushing 78 and is pivotally connected to the short arm 79 of a bell crank 80 pivoted for horizontal swinging movement on a screw 81 studded in a boss 82 formed on the interior of the lower wall of the housing 52. A longer arm 83 of the bell crank 80 has an upturned bifurcated end 84, the forks of which straddle a downwardly extending curved finger 85 secured to the left-hand one of the lens cell frames 59. When the push button 74 is pressed inwardly (as shown in Fig. V), the bell crank 80 is swung in a counterclockwise direction, thus pushing the left-hand cell frames to the left and positioning its lens cells over the "First" and "Third" groups of price indicia and exhibiting the "Low" range of price and amount indicia borne by the price-indicia-bearing member 37 and the chart 35. The left-hand one of the lens cell frames 59 is held in this position by the engagement of the finger 85 with the left arm of a two-armed toggle member 86 which is mounted, by means of a screw 87, on a vertically projecting boss 88 formed on the inner surface of the housing 52. The toggle member 86 is moved into the position shown in Fig. V by means of a pin 89 which extends upwardly from the short arm 79 of the bell crank 80 and engages the toggle member 86 during the inward stroke of the push button 74 (Fig. V), the end of the toggle member 86 being left engaged with the finger 85 and held in such position by means of a toggle spring 90 (Figs. III and V) which extends between an upright finger 91 at the center of the toggle member 86 and a screw 92 studded into a boss 93 of the housing 52 located directly behind the boss 88. The left-hand one of the lens cell carriages 59 is held against the end of the toggle member 86 by the tension of a spring 94 which extends between the two lens cell carriages 59. The toggle spring 90 is prevented from swinging the toggle member 86 too far by two limiting pins 95 which extend upwardly from the inside of the housing 52.

The right-hand one of the lens cell carriages 59 is similarly operated by means of the push button 76 and a bell crank 80a and finger 85a. When the push button 76 is pressed, it swivels the bell crank 80a in a clockwise direction which shifts the lens cell carriage to the right so that its lens cells are located over the "Sixth" and "Eighth" groups of amount indicia (rather than over the "Fifth" and "Seventh" groups) thus exhibiting the "High" series of amount indicia. When the push button 76 is pressed, a pin 89a, which extends upwardly from its connection with the bell crank 80a, swivels the toggle member 86 in a counter-clockwise direction so that its right end engages behind the finger 85a holding the right-hand lens cell carriage 59 in the "High" position and also so that its left end is removed from in front of the finger 85 (into the position shown in Fig. IV) thus releasing the left-hand one of the lens cell carriages 59 which under impetus of the spring 94 connected between the two lens cell carriages, moves the left-hand cell of the carriages 59 toward the center of the scale, swiveling the bell crank 80 in a clockwise direction and moving the push button 74 outwardly until its connection with the bell crank 80 strikes the inside of the lower front wall of the housing 52 and stops the left-hand lens cell carriage in position over the "Second" and "Fourth" groups of amount indicia.

After either the "Low" or "High" series of price indicia have been used, the last used one of such series is left displayed on the scale. When it is desired to display the "Medium" range of prices, that is the price range from 21¢ to 36¢ in the left-hand lens cell carriage and from 37¢ to 52¢ in the right-hand lens cell carriage (as shown in Fig. II) the push button 75 is pressed. This push button is mounted on the outermost end of a stem 96 (Fig. III), the innermost end of which is riveted to a two-armed yoke 97, the arms of which extend one on each side of the screw 87 on which the toggle member 86 is pivoted. By pushing the yoke 97 inwardly, the toggle member 86 is swung until it is centrally positioned, removing the end of that one of its arms engaged with the finger 85 (or 85a) out of engagement therewith and permitting the spring 94 to pull that one of the lens cell carriages which had been moved away from center, to the center, and thus positioning the two lens cell carriages over the "Second," "Fourth," "Fifth" and "Seventh" groups of amount indicia to exhibit consecutive prices from 21¢ to 52¢. When the push button 75 is released, the toggle member 86 swings either to one side or the other (this being immaterial at present) and moves the yoke 97 and push button 75 forwardly into inactive position.

Thus, the "Medium" range of prices, which is most frequently used, usually is exhibited and when it is desired to use either an exceptionally low or an exceptionally high price the operator only has to push the corresponding one of the push buttons 74 or 76 to exhibit the desired price range.

By eliminating the toggle bar 86 and its associated parts and the "Medium" range push button 75, the "Medium" range is exhibited at all times unless one of the other two push buttons is held in. In this slightly modified construction, the operator would have to hold the "Low" or "High" button depressed to see the corresponding range of prices and, upon releasing it, the "Medium" range automatically would be re-exhibited.

The embodiment of the invention that has been disclosed may be modified to meet various requirements.

Having described the invention, I claim:

1. In a computing weighing scale in which amount indicia are inscribed in peripheral columns about a rotatable cylindrical chart and lenses adapted to produce enlarged virtual images of the indicia are moved to selectively bring certain columns into the field of view of said lenses, in combination, a pair of carriages movable parallel to the axis of the chart carrying the lenses for producing the enlarged virtual images of the indicia, resilient means for urging each of the carriages toward a position adjacent the other, a pushbutton and linkage associated with each carriage for shifting that carriage to a remote position, an interlocking latch releasable by shifting either carriage for holding the shifted carriage in its remote position, and a third pushbutton for releasing said latch without shifting either carriage.

2. In a computing weighing scale having groups of columns of amount indicia inscribed on a rotatable cylindrical chart, a price indicia bar and an indicator line cooperating with said chart, and lenses adapted to produce enlarged virtual images of the indicia, in combination, a pair of carriages each movable along said chart to either of two positions, lenses carried in the carriages, each lens adapted to display one of a pair of groups of columns of indicia and when the carriage is shifted to display the other group of columns of the pair, resilient means urging said carriages to a first position to display those indicia most commonly used, a pushbutton and linkage associated with each carriage for moving the carriage to a second position, a latch released by shifting either carriage for holding the last shifted carriage in its second position, and a pushbutton for releasing said latch without shifting a carriage, whereby said carriages tend to maintain themselves to exhibit the commonly used indicia and are selectively shiftable to exhibit other less commonly used indicia.

3. In a computing weighing scale, in combination, a rotatable cylindrical chart bearing amount indicia arranged in eight groups of peripheral columns, a pair of carriages movable along a line parallel to the axis of said chart, a pair of lens cells in each carriage, a lens in each cell adapted to produce an enlarged virtual image of a group of columns of indicia, resilient means urging said carriages to first positions whereby the four groups of columns of indicia most commonly used are displayed, manually operable linkage associated with each carriage to selectively move the associated carriage to a second position to display alternate groups of indicia, a latch released by the moving of either carriage to hold the last moved carriage in its second position, and other manually operable linkage to release said latch without moving either carriage to its second position.

LAWRENCE S. WILLIAMS.